Sept. 23, 1952      I. O. LIMPUS      2,611,397
WIRE SPLICING PLIERS
Filed May 29, 1950      2 SHEETS—SHEET 1
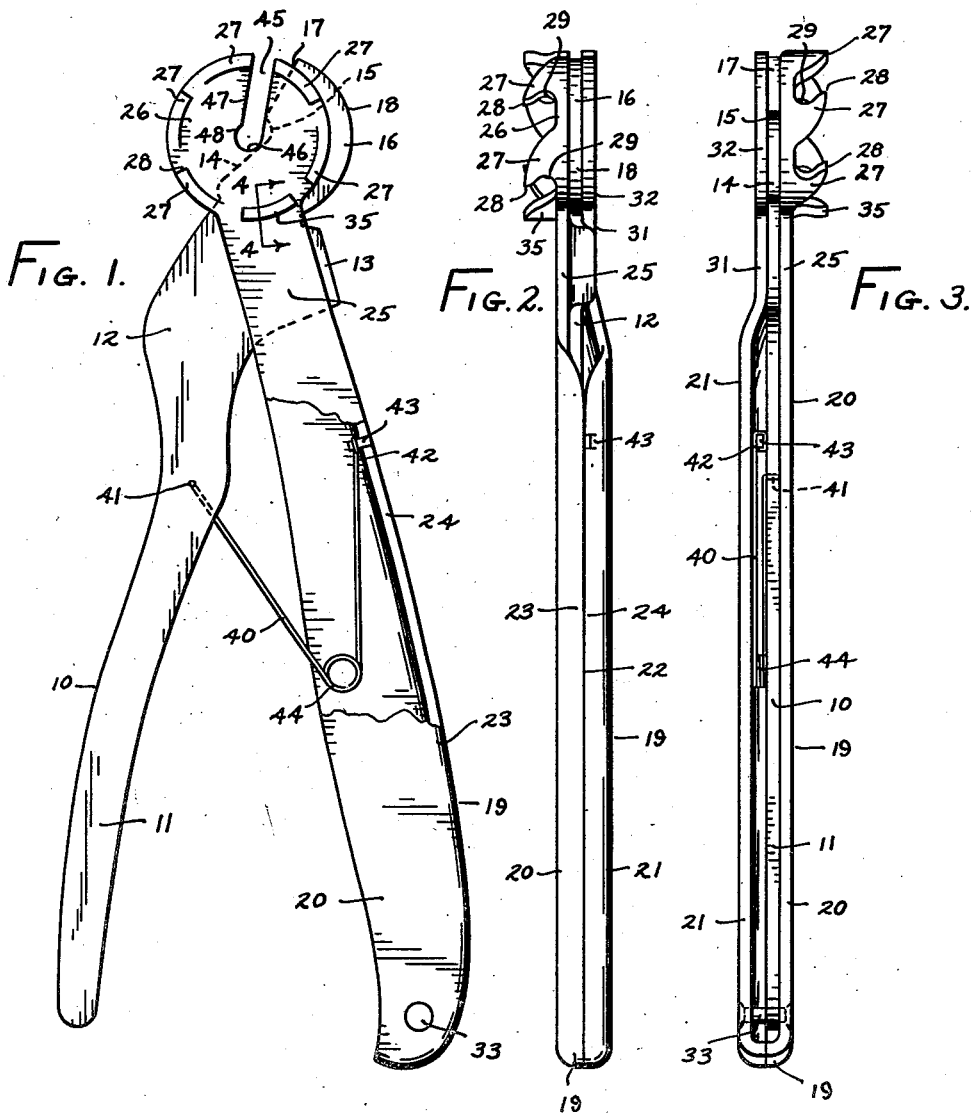

Sept. 23, 1952     I. O. LIMPUS     2,611,397
WIRE SPLICING PLIERS
Filed May 29, 1950     2 SHEETS—SHEET 2
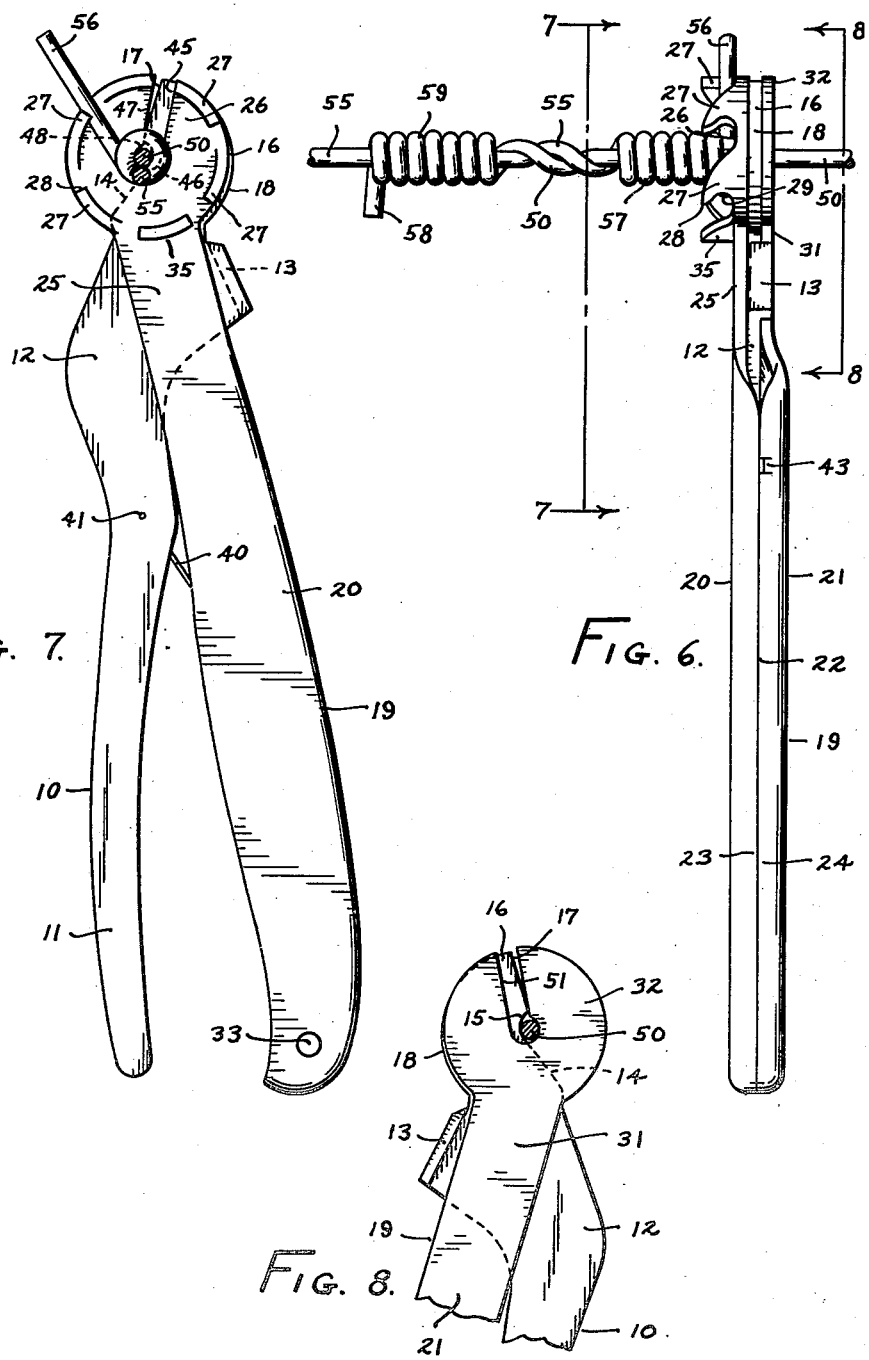
INVENTOR,
ISAAC O. LIMPUS,
By Herbert A. Newbury,
ATTORNEY.

Patented Sept. 23, 1952

2,611,397

UNITED STATES PATENT OFFICE 2,611,397

WIRE SPLICING PLIERS

Isaac O. Limpus, Shelbyville, Ind.

Application May 29, 1950, Serial No. 164,965

1 Claim. (Cl. 140—117)

This invention relates to a tool commonly called pliers for splicing wires wherein the tool will grip a free end of one length of a wire and wrap it around a straight length of the other wire so as to form tightly closed coils of the wire in a manner which will resist unbending.

A primary object of the invention is to provide a tool which will grip the straight length of wire in a manner which will permit the tool to be revolved therearound without slipping off of it, and at the same time will permit a ratchet movement of the tool to engage the free end of the wire being twisted by a consecutive number of teeth spaced around a side face of the tool so that the tool does not have to be completely revolved around the wire in order to effect the splicing operation. This is of a particular advantage in splicing the wires of a field fence where the wires are too closely spaced together to permit the tool to be turned entirely around through a complete revolution about a single wire.

A further primary object of the invention is to provide a tool which is extremely simple in its operation and is yet light in weight, but extremely effective in accomplishing the result sought. These and many other objects and advantages of the invention will become apparent to those versed in the art in the following description of one particular form of the invention as illustrated in the accompanying drawings, in which, Fig. 1 is a view in side elevation of a structure embodying the invention, and with the section of a wall of a handle portion broken away;

Fig. 2 is a view in back edge elevation;

Fig. 3 is a view in the opposite edge elevation;

Fig. 4 is a detail in section on an enlarged scale on the line 4—4 in Fig. 1;

Fig. 5 is a view in side elevation of a pivot tooth;

Fig. 6 is a view in back edge elevation of the tool as applied to wires being spliced;

Fig. 7 is a view in section on the line 7—7 in Fig. 6; and

Fig. 8 is a view in section on the line 8—8 in Fig. 6.

One handle 10 of the pliers is formed to have a gripping portion 11 from which the handle extends into a widened portion 12 to extend rearwardly and have a lip 13 overturned substantially at right angles therefrom. Above the lip 13, the member 10 is formed to have an edge 14 inclined to the general slope of the handle 10 to continue upwardly and then curve rearwardly by a portion 15 through substantially a forty-five degree arc, from the rear edge of which the jaw generally designated by the numeral 16 extends by an edge portion 17 on upwardly into the outer rounded surface 18 which curves back around into the portion 12, Fig. 1. In the form herein shown, the entire member just described is in the nature of a flat plate with the exception of the overturned lip 13.

A second handle portion generally designated by the numeral 19 is formed out of two members 20 and 21. These two members 20 and 21 are rounded to meet along a back line 22. This rounding of the two members 20 and 21 is provided through the lips 23 and 24 which are turned around from flat faces of the members 20 and 21 to abut by their edges on this line 22.

Toward the upper end of the member 20, the inturned lip 23 terminates to leave a flat upper portion 25 which continues upwardly to terminate in a substantially circular head 26. From the peripheral edge portions of the head 26 there is turned outwardly therefrom a plurality of jaws 27, herein shown as five in number. Each jaw 27 is characterized by having an upper arcuate sloping edge starting from the face of the head 26 and continuing around into a terminal point 28 of the jaw, and from which point 28, the jaw 27 is undercut to have a substantially semi-circular face portion 29. This portion 29 continues until it merges into the face of the head 26.

The other member 21 continues upwardly through a flat portion 31 and finally into a circular plate-like head 32 which has the same peripheral diameter in the present showing as that of the head 26.

Lower ends of the two members 20 and 21 are permanently secured together by any suitable means, herein shown as by a rivet 33 extending therethrough. The lips 23 and 24 are so proportioned as to space the upper flat portions 25 and 31 a distance apart which will permit the flat face 12 of the handle 10 to be slidingly inserted therebetween.

A pivot tooth generally designated by the numeral 35, Fig. 5, is formed to have a head shaped to correspond in all respects to one of the jaws 27. From the inner edge portion of this head 36 there is provided a circular shank 37 which extends through the head 26, revoluble through the jaw 16, to seat against the inner face of the plate 32. From the end of the shank 37 there extends a square post 38 to fit through the plate 32 as a means for preventing turning of the tooth 35 in respect to the jaw 16. The outer end of the post 38 is riveted over to form a head 39, Fig. 4, so as to hold the tooth 35 securely in a fixed position to extend from the face of the head 26 between two adjacent jaws 27, Fig. 1.

The member 11 is thus pivoted about the part 37 so that the jaw 16 may be rocked in between the head 26 and the back plate 32 as indicated in Fig. 1, where the jaw 16 is rocked to an outermost position, and as in Fig. 7 where the jaw is rocked to its inward position.

Normally the member 11 is spaced from the member 19 in a yielding manner, such as by a spring 40 which has one end fixed at 41 to the handle 10, and the other end 42 fixed to a turned in peg 43 from the lip 24. The spring 40 has a coiled section 44 between the ends 41 and 42, this portion normally being positioned within the space between the parts 20 and 21.

The head 26 has a slot 45 entering from an upper side between two jaws 27 to extend inwardly to the center of the head 26 where the slot terminates in a rounded edge portion 46, part of which is carried back under the edge 47 in the nature of an undercut 48. This lower end portion of the slot 45 is thus formed to serve as a bearing into which a wire 50 may be seated, and the jaw 16 rocked around theretoward to have curved portion 15 close over the top side of the wire in order to retain the wire 50 centrally positioned through the head 26, across the jaw 16, and through the plate 32. The plate 32 has a slot 51 formed therethrough to coincide in respect to its slope and width, and also its lower end portion with the portions thus described in relation to the slot 45. In other words the head 16 rocks between the head 26 and the back plate 32 to grip the wire 50 therebetween.

In using the tool, the wire 50 is to be considered as being the one to be spliced with the wire 55. These two wires 50 and 55 are twisted together, and then there is an end portion of the wire 55, designated by the numeral 56 turned to substantially right angles to the wire 50. The tool is then applied to the wire 50, to have it extend through the head 26 and the plate 32, and to be gripped by the jaw 16 by pulling the handle 10 toward the member 19, and also positioning the tool to have the end 56 extend across one of the jaws 27 within the undercut portion 29, Figs. 6 and 7. Then by holding the two members 10 and 19 one toward the other, the tool may be rocked around, clockwise in respect to Fig. 7, to carry the end 56 in a wrapping action around the wire 50 to form the various turns 57, Fig. 6. Instead of having to rock the tool through a complete circle around the wire 50, it may be reciprocated by pulling the tool back counterclockwise to allow the tool head 26 and the plate 32 to slide longitudinally of the wire 50 in order to permit the wire end 56 to be engaged against another jaw and then bent further by rocking the tool back clockwise again, and so on until the desired number of turns 57 have been produced. The other portion of the splice is performed in the same manner by engaging the end 58 of the wire 50 and carrying it around the wire 55 to form the number of loops 59 desired. The tool of course is reversed in respect to the position shown in Fig. 6, by having the jaws 27 turned to the right instead of to the left in order to engage that wire end 58.

Then the tool may be disengaged from either the wire 50 or the wire 55 as the case may be simply by releasing the member 10 from the operator's grip to allow it to spread or rock away from the member 19 under the influence of the spring 40 so as to rock the jaw 16 back to that position shown in Fig. 1, whereupon the tool may be removed from the wires being spliced. In order to limit the travel of the member 11 from the member 19, there is the lip 13 provided to be in the path of the outer edge portion of the flat plate part 31 of the member 21. As indicated in Fig. 1, the overturned lip 13 is thus limiting the outward travel of the handle 10.

While I have herein shown and described my invention in the one particular form, it is obvious that structural variations may be employed without departing from the spirit of the invention, and I therefore do not desire to be limited to that precise form beyond the limitations which may be imposed by the following claim.

I claim:

A tool for splicing together overlapping end portions of a pair of wires, comprising a pair of handles; a pair of flat plates carried by one of said handles spaced apart in parallel opposing face relation; each of said plates having a slot entering from an edge to open by an inner end centrally of the plate into a circular hole through the plate, the slot width being less than the diameter of said hole, and one side of the slot being tangential to a side of the hole; a shoulder at the juncture of the other side of said slot with the margin of said hole; said slots and holes being in transverse alignment one with the other; a third plate carried by the other of said handles of a width to be substantially slidably passed between said first plates; a pivot member rockably interconnecting said handles to swing said third plate between said first plates about said member; said third member having an edge portion which will travel between said two plates to cover and uncover said slots; said edge portion having a concave, arcuate portion of substantially the same radius of curvature as that of said holes and having its center of curvature on a circumferential travel line through the axis of the centers of said holes, the concave side of said arcuate portion being directed toward said axis upon travel of the third plate into said slot covering position to reduce the effective opening through said holes; and a plurality of jaws extending laterally from an outer face of one of said first plates in spaced apart relation spaced around a circumferential line centered upon said hole axis; one of said jaws being carried by said pivot member.

ISAAC O. LIMPUS.

REFERENCES CITED

The following references are of record in the file of this patent:

UNITED STATES PATENTS

| Number | Name | Date |
|---|---|---|
| 755,542 | Probasco | Mar. 22, 1904 |
| 815,755 | Smith | Mar. 20, 1906 |
| 940,823 | Probasco | Nov. 23, 1909 |
| 1,129,711 | Mumford | Feb. 23, 1915 |
| 1,314,079 | Heuberger | Aug. 26, 1919 |
| 1,408,622 | Mahan | Mar. 7, 1922 |
| 1,633,401 | Fisher | June 21, 1927 |
| 1,651,210 | Kersey | Nov. 29, 1927 |
| 1,754,023 | Jones | Apr. 8, 1930 |